(12) United States Patent
Groenendijk et al.

(10) Patent No.: US 9,325,587 B2
(45) Date of Patent: Apr. 26, 2016

(54) METHOD AND APPARATUS FOR QUALITY OF SERVICE MONITORING OF SERVICES IN A COMMUNICATION NETWORK

(75) Inventors: Jan Groenendijk, Athlone (IE); Liam Fallon, Athlone (IE); Yangcheng Huang, Athlone (IE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 151 days.

(21) Appl. No.: 14/112,606

(22) PCT Filed: Apr. 18, 2011

(86) PCT No.: PCT/EP2011/056175
§ 371 (c)(1),
(2), (4) Date: Oct. 18, 2013

(87) PCT Pub. No.: WO2012/143040
PCT Pub. Date: Oct. 26, 2012

(65) Prior Publication Data
US 2014/0043973 A1    Feb. 13, 2014

(51) Int. Cl.
H04L 12/26    (2006.01)
H04L 12/24    (2006.01)
H04L 29/08    (2006.01)

(52) U.S. Cl.
CPC .......... *H04L 43/022* (2013.01); *H04L 41/0896* (2013.01); *H04L 41/5025* (2013.01); *H04L 41/5032* (2013.01); *H04L 67/322* (2013.01); *H04L 41/12* (2013.01); *H04L 41/5067* (2013.01)

(58) Field of Classification Search
CPC . H04L 43/022; H04L 41/0896; H04L 67/322; H04L 41/12; H04L 41/5067
See application file for complete search history.

(56) References Cited

U.S. PATENT DOCUMENTS 7,028,228 B1 * 4/2006 Lovy .................. G06F 11/3495
                                                      714/47.2
7,610,370 B2   10/2009 Papini et al.

(Continued)

FOREIGN PATENT DOCUMENTS

CN    1450759 A    10/2003
CN    1998185 A    7/2007
(Continued)

OTHER PUBLICATIONS

Mourelatou, K., et al., "An approach to identifying QoS problems", Computer Communications, Elsevier Science Publishers BV, Amsterdam, NL, vol. 17, No. 8, Aug. 1, 1994, pp. 563-570, XP026651162.
(Continued)

*Primary Examiner* — Mohammad Anwar
(74) *Attorney, Agent, or Firm* — Rothwell, Figg, Ernst & Manbeck, P.C.

(57) ABSTRACT

The present invention relates to a method of quality of service monitoring of at least one service in a communication network. The method comprises a first and a second modes. The first mode comprises detecting degradation in quality of service in a communication network by selecting (80) a set of terminal service sessions for providing terminal service session reports; collecting (82) terminal service session information from the selected terminal service sessions; and determining (84) the quality of service in the communication network from the terminal service sessions monitored in the first mode. The second mode, being entered when a degradation of service quality in at least part of terminal service sessions is detected (86), comprises identifying at least one factor causing degradation of service quality in the communication network in steps of determining (88) at least one potential factor associated with terminal service sessions having degraded service quality as a candidate factor potentially causing the observed service quality degradation in at least part of the terminal service sessions; collecting (90) terminal service session information from terminal service sessions associated with at least one candidate factor; and evaluating (92) collected terminal service session information for service sessions associated with a candidate factor to identify whether the candidate factor is a cause of service quality degradation.

18 Claims, 10 Drawing Sheets

(56) References Cited

U.S. PATENT DOCUMENTS

| | | | |
|---|---|---|---|
| 2001/0039582 | A1 | 11/2001 | McKinnon, III et al. |
| 2007/0002897 | A1* | 1/2007 | Goshen ............ H04L 29/06027 370/468 |
| 2009/0059937 | A1 | 3/2009 | Kanada |
| 2010/0254261 | A1 | 10/2010 | Dattagupta et al. |

FOREIGN PATENT DOCUMENTS

| | | | |
|---|---|---|---|
| CN | 101378357 | A | 3/2009 |
| WO | 2004008783 | A1 | 1/2004 |
| WO | 2005094000 | A1 | 10/2005 |
| WO | 2008/121062 | A1 | 10/2008 |
| WO | 2009/155971 | A1 | 12/2009 |
| WO | 2012/052053 | A1 | 4/2012 |
| WO | 2012/084009 | A1 | 6/2012 |
| WO | 2012/084010 | A1 | 6/2012 |

OTHER PUBLICATIONS

Ericsson, "Keeping the Customer Service Experience Promise," Ericsson White Paper, 284 23-3150 UEN, Jan. 2011, 9 pages.

Gerd Holm-Öste et al., "Ericsson's User Service Performance framework," Ericsson Review No. 1, 2008, pp. 43-46.

"3rd Generation Partnership Project; Technical Specification Group Services and System Aspects; Transparent end-to-end Packet-switched Streaming Service (PSS); Protocols and codecs (Release 9)", 3GPP TS 26.234 V9.5.0, Dec. 2010, 188 pages.

"3rd Generation Partnership Project; Technical Specification Group Services and System Aspects; Multimedia Broadcast/Multicast Service (MBMS); Protocols and codecs (Release 9)" 3GPP TS 26.346 V9.3.0, Jun. 2010, 150 pages.

3rd Generation Partnership Project; Technical Specification Group Services and System Aspects; IP Multimedia Subsystem (IMS); Multimedia Telephony; Media handling and interaction (Release 8), 3GPP TS 26.114 V8.7.0, Dec. 2010, 156 pages.

H. Schulzrinne et al., "RTP: A Transport Protocol for Real-Time Applications," The Internet Society; Network Working Group; Request for Comments: 3500; Obsoletes: 1889; Standards Track, Jul. 2003, 89 pages.

"TR-069 CPE WAN Management Protocol v1.1," Broadband Forum Technical Report, Version: Issue 1 Amendment 2, Dec. 2007, 138 pages.

"TR-106 Data Model Template for TR-069-Enabled Devices," Broadband Forum Technical Report Issue 1 Amendment 4, Feb. 2010, 87 pages.

J. Ott, et al., "RPT Control Protocol (RTCP) Extentions for Single-Source Multicast Sessions with Unicast Feedback," Internet Engineering Task Force (IETF); Request for Comments: 5760, ISSN: 2070-1721, Feb. 2010, 66 pages.

"Enabler Release Definition for OMA Device Management," Open Mobile Alliance, Approved Version 1.2, OMA-ERELD-DM-V1_2-00070209-A Feb. 9, 2007, 14 pages.

Office Action issued on Sep. 11, 2015, in corresponding Chinese Application No. 201180070251.1, 9 pages.

* cited by examiner

METHOD AND APPARATUS FOR QUALITY OF SERVICE MONITORING OF SERVICES IN A COMMUNICATION NETWORK

CROSS-REFERENCE TO RELATED APPLICATION

This application is a 35 U.S.C. §371 National Phase Entry Application from PCT/EP2011/056175, filed Apr. 18, 2011, and designating the United States.

TECHNICAL FIELD

The present invention relates to monitoring of the quality of service of services in a communication network. In particular in some embodiments the invention relates to a method and apparatus for quality of service monitoring of multiple services in a communication network.

BACKGROUND

The telecommunications industry has become more concerned with service delivery to end users and service consumers. The most accurate measurements for assessing the quality of the service delivery are those reported by the end user device. Therefore the information provided by terminal reporting about the quality of the service delivery has become more critical to the operator's business because the operator can measure fluctuations in the quality of delivered services and therefore understand the end-user perception of the quality of services most accurately by measuring quality of services delivered at the terminal.

The challenge for a communication network operator is to balance the impact on the network resources of the additional network load caused by the terminal reporting against the benefits of terminal reporting on the ability of the communication network operator to manage the quality delivered by the communication network for different services.

In the present description, a terminal is defined as an entity that runs a service session. For example, in the case of an Internet Protocol Television (IPTV) service, the terminal might be a TV set, a set top box, or a software program running on a computer.

A number of solutions have been proposed to measure so-called quality of service (QoS) or quality of experience (QoE) metrics and report end user device service quality measurements as set out in the following description. Each individual solution includes mechanisms that allow the network operator to control the load on the communication network caused by measurement reporting load.

The following paragraphs present a brief summary of existing solutions for resource constrained terminal reporting.

The quality of experience (QoE) reporting mechanisms of the $3^{rd}$ Generation Partnership Project technical specification 3GPP TS 26.234 (Packet-switched Streaming Service (PSS)) and the $3^{rd}$ Generation Partnership Project technical specification 3GPP TS 26.346 (Multimedia Broadcast/Multicast Service (MBMS)) specify that the quality of experience (QoE) metrics for a service session are reported after the service session via the reception reporting procedure using hypertext transport protocol (HTTP), session description protocol (SDP) or real time streaming protocol (RTSP) in a single transmission control protocol (TCP) session.

For example, the session and media-level attribute "a=3GPP-QoE-Metrics" is used to negotiate the usage of the quality of experience (QoE) metrics. The included parameters indicate which metrics, and the duration over which the metrics should be measured, and how often reports should be sent.

In particular, "Sending-Rate" defines the maximum time period in seconds between two successive quality of experience QoE reports. The shortest interval is one second. The reporting interval can be different for different media. The value "End" indicates that only one report is sent at the end of the session.

The optional "Measure-Resolution" field defines a time over which each metrics value is calculated. The "Measure-Resolution" field splits the session duration into a number of equally sized periods where each period is of the length specified by the "Measure-Resolution" field. The "Measure-Resolution" field is thus defining the time before the calculation of a quality of experience QoE parameter re-starts. If the "Measure-Resolution" field is not present the metrics resolution shall cover the period specified by the "Measure-Range" field. If the "Measure-Range" field is not present the metrics resolution shall be the whole session duration.

The quality of experience QoE metrics are calculated for each period specified by the "Measure-Resolution" field and stored in the terminal, and all the stored metrics are then sent together according to the "Sending-Rate" field. This allows long reporting intervals thus saving bandwidth without losing good metric measurement resolution. It is recommended that the Sending-Rate is set to an integer multiple of the Measure-Resolution, or to "End".

A mechanism to randomize terminal reporting of a population of terminals is described in the $3^{rd}$ Generation Partnership Project technical specification for Multimedia Telephony Service for IMS 3GPP TS 26.114(MTSI), paragraph 16.3.3.

The SamplePercentage rule is used to set a percentage sample of calls that should report reception. This can be useful for statistical data analysis of large populations while increasing scalability due to reduced total uplink signalling. The sample_percentage parameter takes on a value between 0 and 100, including the use of decimals. It is recommended that no more than 3 digits follow a decimal point (e.g. 67.323 is sufficient precision).

When the SamplePercentage rule is not present or its sample_percentage parameter value is 100 each MTSI client terminal shall send metric report(s). If the sample_percentage value is less than 100, the MTSI client terminal generates a random number that is uniformly distributed in the range of 0 to 100. The MTSI client terminal sends the reception report when the generated random number is of a lower value than the sample_percentage value.

The LimitSessionInterval rule is used to limit the time interval between consecutive calls that report metrics. The min_interval parameter for this rule indicates the minimum time distance between the start of two calls that are allowed to report metrics. When this rule is absent there is no limitation on the minimum time interval.

When multiple rules are defined in the Management Object, the MTSI client should only report metrics when all individual rules evaluate to true (i.e. the rules are logically ANDed). When no rules are present the MTSI client should always report metrics.

An example for a QoE metric reporting rule is shown below:
3GPP-QoE-Rule: OnlyCallerReports, SamplePercentage; sample_percentage=10.0, LimitSessionInterval; min_interval=300, This example rule defines that only a caller terminal shall report, and only for 10% of the sessions, with the minimum time interval between the start times of two consecutive calls that report metrics to be 5 minutes.

RTCP (Real-time Transport Control Protocol) periodically transmits control packets to participants (including multiple content senders and multiple content receivers) in a real-time transport protocol (RTP) based streaming multimedia session, enabling group size estimation and the distribution and calculation of session-specific information such as packet loss and round trip time to other hosts.

As defined in RFC 3550, the Real-time Transport Control Protocol (RTCP) traffic is limited to a small and known fraction of the Real-time Transport Control Protocol RTCP session bandwidth. This determination is based on some cost or a priori knowledge of the available network bandwidth for the session and the sum of the nominal bandwidths of the senders expected to be concurrently active. The fraction of the bandwidth available for the Real-time Transport Control Protocol (RTCP) traffic is small so that the primary function of the transport protocol to carry data is not impaired and is known so that the control traffic can be included in the bandwidth specification given to a resource reservation protocol, and so that each participant can independently calculate its share. It is recommended that the fraction of the session bandwidth added for Real-time Transport Control Protocol (RTCP) traffic be fixed at 5%.

The calculation of Real-time Transport Control Protocol (RTCP) receiver reporting (RR) interval is as follows (assuming receiver reports takes ¾ of the overall Real-time Transport Control Protocol (RTCP) bandwidth):

$$\text{number of receivers} \times \frac{\text{average } RTCP \text{ packet size}}{0.75 \times RTCP \text{ bandwidth}}$$

The Broadband Forum (formerly DSL Forum) technical report TR-069 specifies a protocol for communication between an Auto-Configuration Server (ACS) and Customer Premise Equipment (CPE). The Auto-Configuration Server (ACS) is a server within the service provider's network that has the ability to control and monitor a Customer Premise Equipment (CPE) with the TR-069 protocol.

The Customer Premise Equipment (CPE) wide area network (WAN) Management Protocol is intended to support a variety of functions to manage a collection of Customer Premise Equipment (CPE), including: auto-configuration and dynamic service provisioning; software/firmware image management; status and performance monitoring; and diagnostics. The data model is defined by the Broadband Forum in technical report TR-106.

The Broadband Forum (formerly DSL Forum) technical report TR-069 framework does not specify any mechanism for specifying, controlling or throttling terminal measurements. Such functions may be implemented as vendor specific extensions.

The internet Engineering taskforce IETF request for comment document RFC 3550 describes a generic design of dynamic quality of service (QoS) reporting rate, for the purpose of reporting overhead reduction, In order to prevent control traffic from overwhelming network resources and to allow Real-time Transport Protocol RTP to scale up to a large number of session participants, Real-time Transport Control Protocol RTCP control traffic is limited to at most 5% of the overall session traffic. This limit is enforced by adjusting the rate at which Real-time Transport Control Protocol RTCP packets are periodically transmitted as a function of the number of participants.

Internet Engineering Task Force IETF RFC 5760 "RTP Control Protocol (RTCP) Extensions for Single-Source Multicast Sessions with Unicast Feedback" proposes a hierarchical terminal report aggregation model, aiming at increasing the maximum number of users limit and enabling Quality of Service (QoS) measurement for those users.

The proposed hierarchical Real-time Transport Control Protocol RTCP feedback aggregation solution is used with Source-Specific Multicast where only a single source is permitted and allows intermediate nodes ("feedback targets") or the distribution source to summarize quality of service (QoS) information received from all the receiver reports generated by terminals and place the summarised quality of service (QoS) information into summary reports. The transmission of summary quality of service reports instead of original quality of service reports results in a saving in required bandwidth.

The invention seeks to at least ameliorate the disadvantages of the prior art and to provide a method and apparatus for quality of service monitoring of multiple services in a communication network.

SUMMARY

In accordance with one aspect of the invention there is provided a method of quality of service monitoring of least one service in a communication network. The method comprises a first mode and a second mode. In a first mode degradation in quality of service in a communication network is detected. In the first mode a set of terminal service sessions for providing terminal service session reports are selected from the resulting terminal service session reports and terminal service session information from selected terminal service sessions are collected. The quality of service in the communication network is determined from the terminal service sessions monitored in the first mode. The second mode is entered when a degradation of service quality in at least part of terminal service sessions is detected. In the second mode at least one factor causing degradation of service quality in the communication network is identified. In the second mode at least one potential factor associated with terminal service sessions having degraded service quality is determined as a candidate factor potentially causing the observed service quality degradation in at least part of the terminal service sessions. Terminal service session information is collected from terminal service sessions associated with at least one candidate factor. The collected terminal service session information for service sessions associated with a candidate factor is evaluated to identify whether the candidate factor is a cause of service quality degradation.

In embodiments of the invention terminal service session information is collected from terminal service sessions in the first mode by sending to all terminals session reporting request configurations containing the selected set of terminal service sessions and terminals running the selected set of terminal service sessions sending terminal service session reports as requested In embodiments of the invention the selection of a set of terminal service sessions in the first mode is achieved by selecting from a plurality of services in the communication network a sub-set of services providing service reporting coverage for the total network resources to be monitored. A set of terminal service sessions relating to the selected sub-set of services are then selected wherein the selected terminal service sessions of the selected sub-set of services are instructed to send terminal service session reports of the selected sub-set of services.

In some embodiments of the invention a sub-set of services are selected from a plurality of services by determining a network monitoring requirement corresponding to the total network resources to be monitored. Then, for each service, the service reporting coverage corresponding to the network resources that can be monitored using terminal service quality information from terminal service sessions of the service are defined. One or more services can be selected from the plurality of services in the communication network to monitor such that the sum of the service reporting coverage for the selected services covers the network monitoring requirements of the communication network.

In some embodiments of the invention, the services selected from the plurality of services comprise a minimum set of services sufficient to provide a cumulative service reporting coverage sufficient to cover the network monitoring requirements of the communication network.

In some embodiments of the invention, the service reporting coverage for a service is determined from an analysis of the terminal service quality information from previous terminal service session reports for that service.

In some embodiments of the invention, the set of terminal service sessions selected in the first mode by selecting a set of terminal service sessions on a reduced sample reporting basis requiring only a proportion of service sessions of a service or of a network area to send a terminal service session report.

In some embodiments of the invention, the terminal service quality information from a plurality of terminal service sessions having degraded service quality are correlated with a potential quality factor; and the quality factor is determined as a candidate quality factor causing degraded service quality if the quality factor is correlated with the terminal service quality information from a plurality of terminal service sessions having degraded service quality.

In embodiments of the invention, the potential factors relate to one or more of: the service, the network location, the device; the type of terminal In embodiments of the invention, in the second mode, if a plurality of factors are found as candidate factors in the step of determining at least one factor, the candidate factors are ranked in order of the likelihood that they are a cause of service quality degradation; and selecting candidate factors are selected for evaluation in the order of their ranking.

In embodiments of the invention, the number of degraded sessions associated with the factor is determined and a ranked list of a plurality of candidate factors is formed in accordance with the number of degraded sessions associated with the factor.

In embodiments of the invention, wherein it is determined whether the service sessions having a service degradation are statistically significant among all terminal service session reception reports associated with that selected factor to evaluate whether a candidate factor is a cause of the degraded service quality sessions.

In embodiments of the invention, the terminal service quality information is determined from one or more terminal service session reports collected.

In embodiments of the invention, in a first step a global quality of service resource limit defining the total resource available for monitoring the quality of service for a plurality of services in the communication network is configured. In a second step service reporting resource requirements for each of the plurality of services are estimated. In a third step the available global quality of service resource are allocated to the plurality of services depending upon the estimated service reporting resource requirements for the plurality of services. In a fourth step terminals are instructed to send terminal service session reports for each of the plurality of services depending on the allocated quality of service resource for that service.

In embodiments of the invention, the global quality of service resource limit available is adapted depending on demand.

In embodiments of the invention, in response to a positive determination of a degradation of service quality in terminal service sessions of the service, the service reporting resource requirement for the service is increased.

In some embodiments of the invention, in a further step the reporting resource requirement of the current terminal service sessions are estimated. If it is determined that the global quality of resource limit is reached the terminal reporting resource allocated in areas in which a degradation of service quality has not been reported is decreased.

In accordance with one aspect of the invention there is provided an apparatus for quality of service monitoring of terminal service sessions in a communications network. The apparatus has a service quality reporting controller for requesting terminal service session reports in response to reporting configuration information. The apparatus also has a service quality report collector, arranged to collect terminal service quality information requested by the service quality reporting controller in respect of terminal service sessions. The apparatus also has a service quality reporting analyser, arranged to receive terminal quality information collected by the service quality report collector; and to provide reporting configuration information to the service quality reporting controller. The service quality reporting analyser is operable in a first mode to detect degradation in quality of service in a communication network by selecting a set of terminal service sessions for providing terminal service session reports; and determining the quality of service in the communication network from the terminal service session information collected from selected terminal service sessions monitored in the first mode. The service quality reporting analyser is operable in a second mode, entered when a degradation of service quality in at least part terminal service sessions is detected, in which at least one factor causing degradation of service quality in the communication network is identified by determining at least one potential factor associated with terminal service sessions having degraded service quality as a candidate factor potentially causing the observed service quality degradation in at least part of the terminal service sessions; and by evaluating collected terminal service session information for service sessions associated with a candidate factor to identify whether the candidate factor is a cause of service quality degradation.

In accordance with a further aspect of the invention there is provided a method of allocating resources to quality of service monitoring of terminal service sessions of a plurality of services in a communication network. In a first step, a global quality of service resource limit defining the total resource available for monitoring the quality of service for a plurality of services in the communication network is configured. In a second step the service reporting resource requirements for each of the plurality of services are estimated. In a third step the available global quality of service resource limit are allocated to the plurality of services depending upon the estimated service reporting resource requirements for the plurality of services. In a fourth step terminals are instructed to send terminal service session reports for each of the plurality of services depending on the allocated quality of service resource for that service.

In embodiments of the invention, the global quality of service resource limit available is adapted depending on demand.

In embodiments of the invention, in response to a positive determination that a degradation of service quality in terminal service sessions of a service has occurred, the service reporting resource requirement for the service is increased.

In some embodiments of the invention, in a further step the reporting resource requirement of the current terminal service sessions are estimated. If it is determined that the global quality of resource limit is reached, the terminal reporting resource allocated in areas in which a degradation of service quality has not been reported is decreased.

In another aspect of the invention there is provided an apparatus for quality of service monitoring of terminal service sessions in a communications network. The apparatus comprising: a service quality reporting controller for requesting terminal service session reports in response to reporting configuration information. The apparatus also comprises a service quality report collector, arranged to collect terminal service quality information requested by the service quality reporting controller in respect of terminal service sessions.

The apparatus also comprises a service quality reporting analyser, arranged to receive terminal quality information collected by the service quality report collector; and to provide reporting configuration information to the service quality reporting controller. The service quality reporting analyser is operable to configure a global quality of service resource limit defining the total resource available for monitoring the quality of service for a plurality of services in the communication network. The service quality reporting analyser is operable to estimate service reporting resource requirements for each of the plurality of services. The service quality reporting analyser is operable to allocate the available global quality of service resource limit to the plurality of services depending upon the estimated service reporting resource requirements for the plurality of services. The service quality reporting analyser is operable to instruct terminals to send terminal service session reports for each of the plurality of services depending on the allocated quality of service resource for that service.

DETAILED DESCRIPTION

Figure 1:
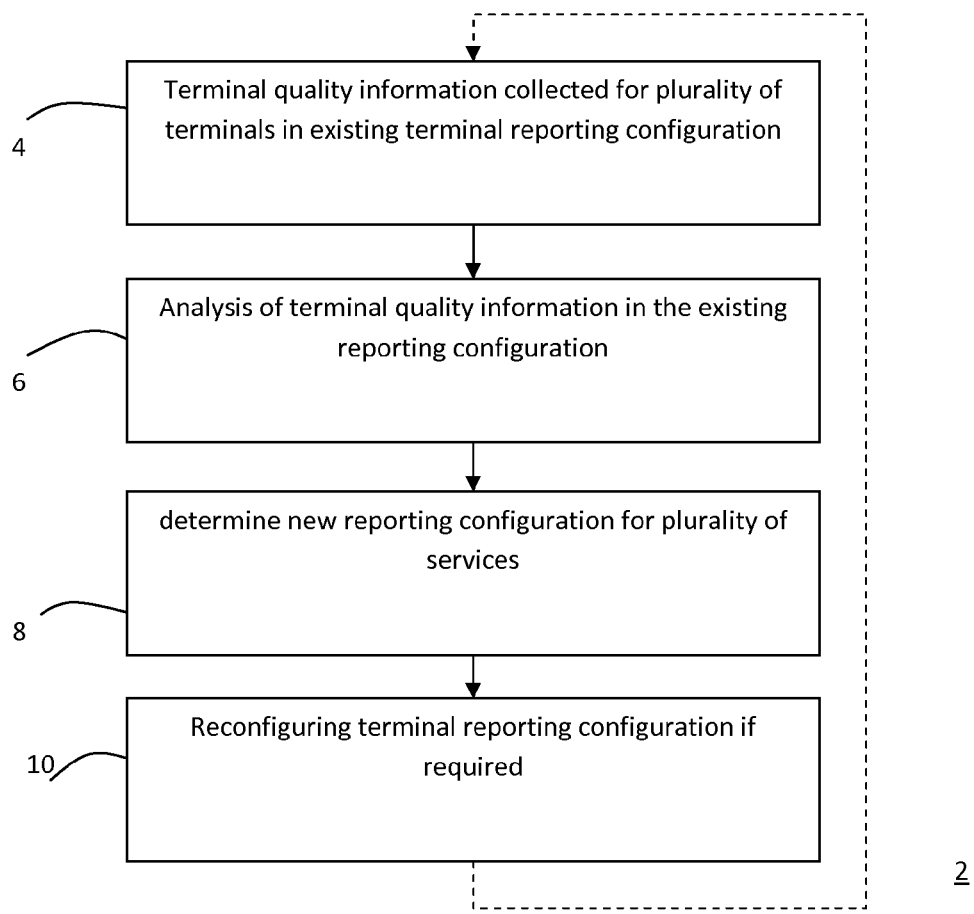
FIG. 1 is a flow chart showing steps of a method of service quality monitoring of services in a communication system.

Embodiments of the invention provide a method and apparatus for service quality monitoring of services in a communication system.

In accordance with embodiments of the invention, the determination of a terminal quality reporting configuration is carried out in a unified manner for a number of services. This enables management of the terminal quality reporting for all services in the network to be managed as a whole. In embodiments of the invention this enables the total network resources applied to quality management to be controlled by the network operator on a network-wide basis Embodiments of the invention provide coordinated terminal quality reporting for multiple services. In embodiments of the invention terminal reporting controlling functions for each service are separated from the associated terminal reporting traffic and data flow, thus providing a control plane for terminal reporting across multiple services. Embodiments of the invention can therefore work seamlessly with existing terminal reporting arrangements for the different services in the network with no need for significant changes to the implementation of existing terminal reporting arrangements. In some embodiments it is envisaged that the terminal quality reporting method disclosed herein is used exclusively for quality monitoring in the communication network.

Embodiments of the invention manage a reporting configuration for the plurality of services within the communication network. The reporting configuration at any time represents the terminal service sessions that are reporting service measurements. The reporting configuration may change with respect to the services for which quality measurements are required and/or with regard to the terminals and/or location of terminals within network segments for which quality measurements are required. Terminals fulfilling the reporting configuration report their experienced quality of service levels and the terminal service quality information is analyzed to determine a service problem in the communication network and is also used to determine a new reporting configuration for the terminals, if required.

In particular, in embodiments of the invention the performance characteristics of the reporting terminals for a plurality of services in accordance with the reporting configuration are monitored. In some embodiments this is achieved by collecting the output of the terminal reporting systems for each of the services running on the communication network. In other embodiments, this may be achieved by directly accessing the data storage for the terminal reporting systems for each of the services running on the communication network.

A new reporting configuration for the plurality of services may be determined for the plurality of services in the communication network as a whole, taking into account the reporting requirements of each of the services. The reporting configuration can be updated through configuration management functions, as will be explained in more detail hereafter. As will be clear from a consideration of the following description, in embodiments of the invention, rate limiting for reporting traffic may enforced through the configuration management functions of each service delivery protocol, and/or may be enforced by the traffic shaping and regulations of intermediate nodes.

An exemplary method 2 of service quality monitoring of multiple services in a communication system will be described with reference to FIG. 1.

In a first step 4, terminal service quality information for a plurality of terminals in an existing reporting configuration is collected. In embodiments of the invention, the terminal service quality information is obtained from a terminal quality report relating to the quality of service at a terminal for at least one service within the network. The terminal configuration reports are received from the terminals in accordance with the existing terminal configuration, and different terminal reports may relate to different services within the network.

In a second step 6, the terminal quality information for the plurality of terminals in the existing reporting configuration is analysed. Additional information, such as topological information relating to the position within the network of, or relationship between, terminals in a reporting configuration that are providing terminal reports, may be used in order to assess the reporting requirements of different services or different areas of the communication network.

In a third step, 8, a new reporting configuration for the services is determined, if required. In some embodiments, the new reporting configuration may be determined in response to the analysis of the terminal quality information. Additionally or alternatively, in some embodiments the new reporting configuration may be determined in response to other information, for example a notification of a quality degradation in the communication network.

In a fourth step, step 10, if the analysis of the terminal quality information results in the determination in step 8 of a new reporting configuration different from the existing reporting configuration, reconfiguration instructions to reconfigure the reporting behaviour of the terminals are sent to the terminals. The reconfiguration instructions may be sent to the terminals directly via a device manager for example in some embodiments, or in other embodiments reconfiguration instructions for terminal service sessions for a service may be sent to a quality reporting configuration manager for the service.

Thereafter the terminals produce quality reports in accordance with the new reporting configuration which is to be considered as the existing reporting configuration during the next iteration of the analysis.

In some embodiments a reporting configuration for the plurality of services within the network is determined based on an analysis of the reporting requirements of all of the services. In such embodiments, the amount of resources consumed by terminal quality reporting can be controlled. This enables an operator of a communication network to select the resources to be applied to quality monitoring, therefore enabling control of the trade-off between improving the quality experienced at a terminal, and maximising the throughput of the communication system.

In addition, in some embodiments the total resources applied to quality monitoring may be varied dynamically over time, either in a planned manner, or in response to conditions in the network. For example, if a quality problem is detected, more resources may be applied to quality reporting management temporarily while the quality problem is identified and resolved. Once the quality levels reported in the network have returned to acceptable levels, the quality management resources may be reduced.

Furthermore, in such embodiments if the analysis of the terminal service quality information of the different services indicates that only a sub-set of the services are reporting quality problems, the quality reporting resources may be applied disproportionately to those services. In this way, the quality monitoring resources may be applied to maximum effect in resolving quality problems in the network.

In some embodiments the analysis of the terminal service quality information may indicate that a specific geographical area or network segment is experiencing quality problems. In this case, a more detailed monitoring of the identified problem areas can be carried out, with the quality reporting resources being applied disproportionately to those network areas. Again, in this way the quality monitoring resources may be applied to maximum effect in resolving quality problems in the network.

In many cases a number of different services operate inside a network and are delivered to the same terminals and therefore quality reports for a number of services may reflect similar or the same network condition. In such a situation redundant information exists between the reception reports. In some embodiments, as will be described later it is possible to monitor the quality of services within the network as a whole effectively without monitoring all services directly. In this case, the reporting configuration may not specify terminal service session reporting for all services.

Additionally or alternatively, in some embodiments a reporting configuration in which terminal service quality information is collected from only a low percentage sample of the service sessions or terminals during a monitoring mode. However, if a quality problem is detected during a monitoring mode, the terminal service quality information is analysed to determine possible factors causing the degradation of quality. A new reporting configuration for obtaining terminal service quality information from terminal service sessions associated with one or more of the possible factor(s) is established to determine whether a possible factor is causing service degradation.

Figure 2:
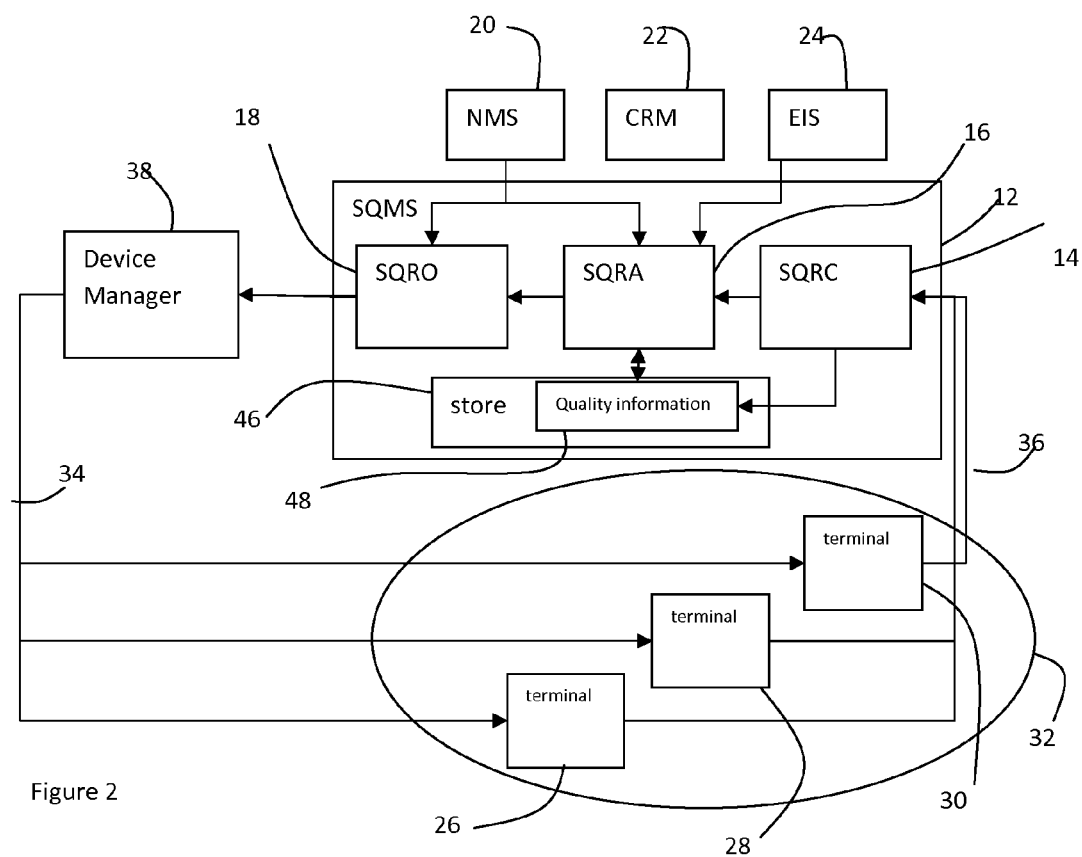
FIG. 2 is a schematic block diagram of a first embodiment of an apparatus capable of implementing the method in accordance with aspects of the invention.
Figure 3:
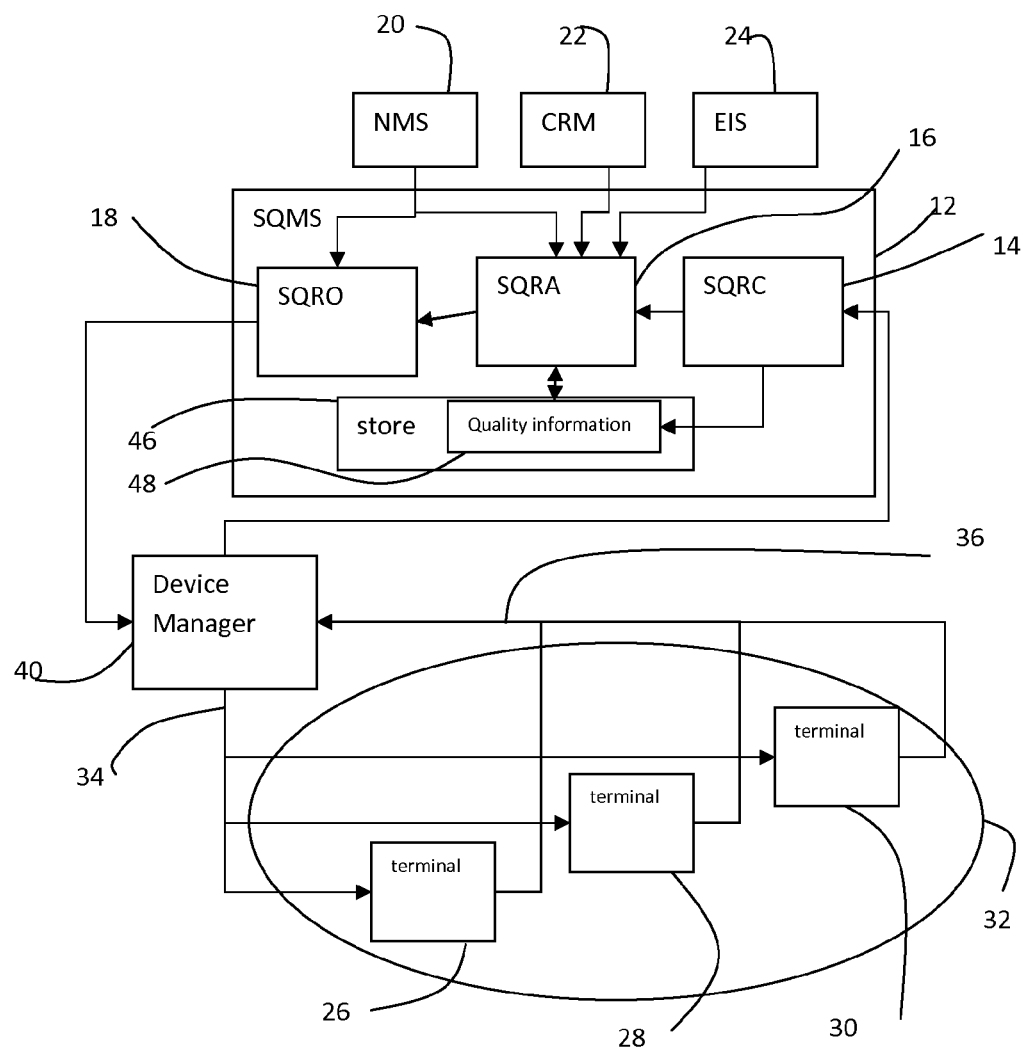
FIG. 3 is a schematic block diagram of a second embodiment of an apparatus capable of implementing the method in accordance with aspects of the invention.
Figure 4:
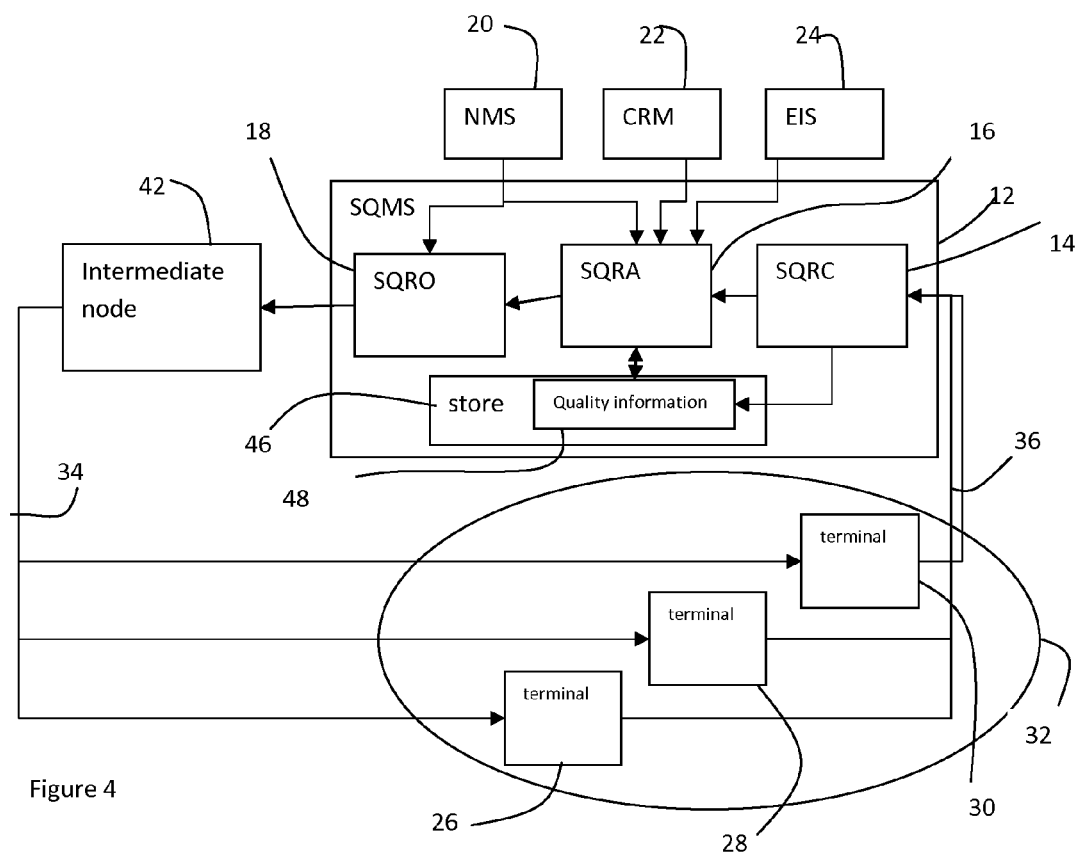
FIG. 4 is a schematic block diagram of a third embodiment of an apparatus capable of implementing the method in accordance with aspects of the invention.
Figure 5:
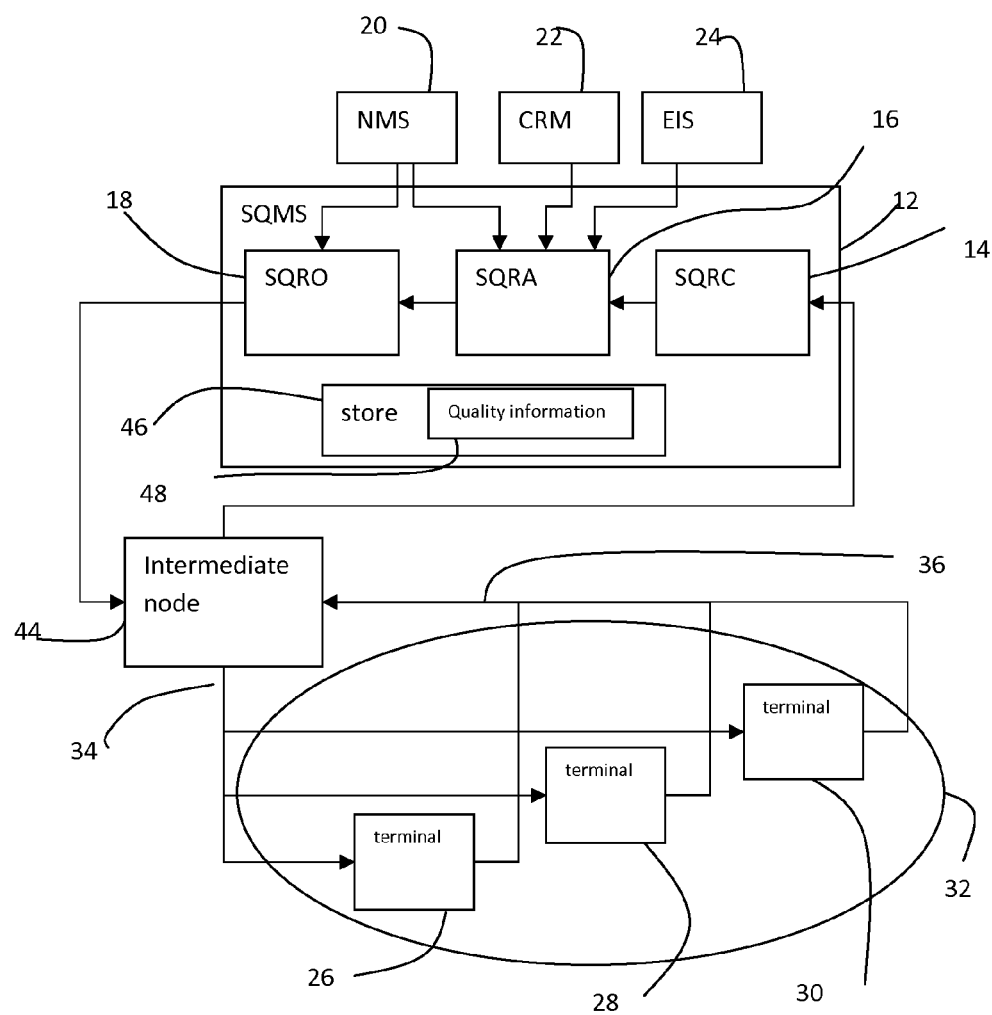
FIG. 5 is a schematic block diagram of a fourth embodiment of an apparatus capable of implementing the method in accordance with aspects of the invention.

A first embodiment of an apparatus capable of implementing the method in accordance with aspects of the invention is shown in FIG. 2. A second embodiment of an apparatus capable of implementing the method in accordance with aspects of the invention is shown in FIG. 3. A third embodiment of an apparatus capable of implementing the method in accordance with aspects of the invention is shown in FIG. 4. A fourth embodiment of an apparatus capable of implementing the method in accordance with aspects of the invention is shown in FIG. 5. In these Figures, the same or similar elements have been given the same reference numerals for clarity.

An exemplary service quality management system (SQMS) 12 in accordance with the exemplary embodiments of the invention as shown in FIGS. 2-5 is provided to implement the methods of embodiments of the invention, as will be explained in more detail in the following description. The service quality management system (SQMS) 12 is provided with a service quality report collector (SQRC) 14, a service quality reporting analyser (SQRA) 16 and a service quality reporting controller (SQRO) 18.

The service quality management system (SQMS) 12 is also provided with a store 46 in which is stored terminal service session quality information 48, as will be explained in the following description. The store 46 might typically be implemented as a database. The service quality report collector (SQRC) 14 and the service quality reporting analyser (SQRA) 16 are coupled to the store 46 for storing and accessing the terminal service session quality information 48, as will be explained in the following description.

Typically the service quality report collector (SQRC) 14, the service quality report analyser (SQRA) 16 and the service quality report controller (SQRO) 18 are implemented as software modules within a software program. However, in other embodiments the service quality management system (SQMS) 12 may be implemented in other ways as will be apparent to a skilled person from a consideration of the following description.

In addition, although the service quality report collector (SQRC) 14, the service quality report analyser (SQRA) 16 and the service quality report controller (SQRO) 18 are shown as separate functional modules, the separation is merely exemplary and the functions described for each of the modules may be combined or performed by other modules, as will be apparent to a skilled person.

In some embodiments, as will be apparent to a skilled person from a consideration of the following description, the service quality management system (SQMS) 12 may be implemented to manage the quality of service for a single service.

In other embodiments, as will be apparent to a skilled person from a consideration of the following description, the service quality management system (SQMS) 12 may be implemented to manage the quality of service for a plurality of services operating within the communication network.

The service quality report analyser (SQRA) 16 and the service quality report controller (SQRO) 18 are coupled to a network management system 20 to receive network information from the network management system 20.

The network management system 20 monitors the network resources and may provide information relating to the network to the service quality management system (SQMS) 12. In some embodiments, the network management system 20 may provide network status information; network topology information; and network equipment status information to the service quality management system (SQMS) 12. The information from the network management system 20 can be used to enhance the terminal service session information and therefore making it possible to deploy more terminal reporting where needed.

In embodiments of the invention the service quality report controller (SQRO) 18 and the service quality report analyser (SQRA) 16 access the network topology information to relate the terminal service session quality information to the network configuration and topology.

Typically, the service quality report analyser (SQRA) 16 and the service quality report controller (SQRO) 18 are arranged to receive topological information from the network management system 20, so that the terminal service session quality information 48 can be understood with reference to the topology of the communication network, and so that a new reporting configuration for terminals can be determined based on the topology of the network.

In addition, in some embodiments the service quality report analyser (SQRA) 16 is coupled to a customer relationship management system 22 and/or other external information systems 24, as will be discussed in due course. The customer relationship management system 22 and other external information systems 24 can supply information to assist the operation of the service quality report analyser (SQRA) 16 as will be understood with reference to the following description.

Three terminals 26, 28, 30 are shown as examples of the plurality of terminals present within a typical communication network 32. Each of the terminals 26, 28, 30 may operate one or more of a plurality of services within the communication network 32. Typically the terminals 26, 28, 30 are end-user devices capable of providing at least one service to an end-user. The terminals 26, 28, 30 are capable of receiving and understanding quality report configuration parameters 34 relevant to the services being delivered, and can be configured to generate quality measurements relating to a service session and to send quality measurement reports 36.

In all of the embodiments, the exemplary plurality of terminals 26, 28, 30 receive quality report configuration parameters 34 relevant to the service being delivered by the terminals 26, 28, 30, and send quality measurement reports 36 relating to the quality of service experienced by the end-user of the terminal 26, 28, 30. The terminals 26, 28, 30 contain functionality for reporting measurements that can be used to express the quality of the service delivery to the end-users of the terminals 26, 28, 30.

In some embodiments, the quality measurement reports 36 may be sent directly to the service quality management system (SQMS) 12.

In other embodiments the quality measurement reports 36 for each service may be sent to the individual service management system (not shown) for the managed service, for embodiments in which the quality of a single service is being managed, or to the individual service management systems (not shown) for each of the managed services, for embodiments in which the quality of a plurality of services are being managed.

As will be apparent to a skilled person from the following description, the service quality report collector (SQRC) 14 may obtain terminal service session quality information 48 from processing received quality measurement reports 36, or may be provided with access to terminal service session quality information processed and stored by one or more individual service management system.

In some embodiments, such as the embodiments shown in FIGS. 2 and 3, the terminal session quality measurement set-up and configuration may be carried out directly by the Service Quality Report Controller (SQRO) 18 of the service quality management system (SQMS) 12 via appropriate device managers 38, 40.

In some embodiments, such as the embodiments shown in FIGS. 4 and 5 the quality measurement set-up and configuration may be carried out via intermediate systems 42, 44.

Intermediate systems 42, 44 may require configuration management instructions from the service quality management system (SQMS) 12 for the configuration of the reporting function in the terminals. Intermediate systems 42, 44 provide the functionality to convert the instructions received from the service quality management system (SQMS) 12 to the specific terminal instructions for the terminals they manage in order to request terminals to send terminal quality reports.

Such intermediate systems 42, 44 may be commercially available systems supporting, for example 3GPP compliant terminals and terminals compliant with the Broadband Forum (formerly DSL Forum) technical report TR-069 framework, as will be known to a skilled person.

The terminal reports can be sent directly to the service quality report collector (SQRC) 14, as in embodiments shown in FIGS. 2 and 3 or via the intermediate system 42, 44 as shown in embodiment shown in FIGS. 4 and 5. In arrangements such as the arrangement shown in FIG. 4 and FIG. 5 the intermediate system can provide additional functionality to increase or decrease terminals reports in the area under control of the intermediate system. The operation of the service quality report collector (SQRC) 14, the service quality reporting analyser (SQRA) 16 and the service quality reporting controller 18 will now be described in more detail. The description relates to an embodiment in which the quality of service of a plurality of services within the communication network is being managed. However, as will be appreciated, some embodiments may be applicable to the management of a single service.

The Service Quality Report Collector (SQRC) 14 obtains terminal quality service information that conveys information about the quality of the service delivery to the service consumer at the plurality of terminals 26, 28, 30.

In some embodiments, the service quality report collector (SQRC) 14 is arranged to receive quality reports from the terminals 26, 28, 30 and to process the quality reports to obtain terminal service quality information 48. In some embodiments the resulting terminal service quality information 48 is stored in the service quality monitoring system, for example in a store 46 typically implemented as a database.

In some embodiments, the service quality report collector (SQRC) 14 is arranged to have access to the quality reports sent by terminals to a service management entity (not shown) or is able to access directly quality information derived from quality reports sent by terminals to a service management entity.

The Service Quality Reporting Analyser (SQRA) 16 analyses the terminal service quality information 46 collected by the service quality report collector (SQRC) 14. analysis may indicate which terminals and which services are experiencing a degradation of service, for example a reduced level of quality of service that a service consumer may perceive poorly. The service quality reporting analyser (SQRA) 16 determines from the results of the analysis whether a new reporting configuration for the services is required.

Since the terminal reporting functions use network, CPU and database resources it is advisable to deploy terminal reporting functions only where the service consumption is impacted or likely to be impacted.

A set of policies may be provided by the Service provider to enable the Service Quality Reporting Analyser (SQRA) 16 to determine a quality reporting configuration specifying a desired distribution of the terminals reporting measurements in respect of the different services. The service quality reporting analyser (SQRA) 16 calculates the reporting configuration with the aid of such policies.

Information from other systems may be combined with the quality information from terminal reports and the set of policies to enable the Service Quality Reporting Analyser (SQRA) 14 to draw conclusions about the distribution of the terminals reporting measurements. The information from the terminal may be enriched with additional information from the following sources: the network Management System 18; Customer relationship management system 20; and other External Information Systems 22 as discussed above.

Examples of parameters that can be used to formulate policies for influencing the reporting configuration are:
  Type of Service (voice, TV, MMS)
  Terminal (model, type, vendor)
  Client (model, type, vendor)
  User Category (police, fire brigade)
  Priority (depending on the operator's business goals)
  Location
  Geographical location
  Time
  Access Type (mobile or fixed)

The Service Quality Report Controller (SQRO) 18 may reconfigure the existing reporting configuration to a new reporting configuration if this is considered necessary, as will be apparent from a consideration of the following description. The new reporting configuration is the outcome of the analysis process and application of the policies in the Service Quality Reporting Analyser (SQRA) 16.

The Service Quality Reporting Analyser (SQRA) 16 could for example request the Service Quality Report Controller (SQRO) 18 to increase the reporting capabilities in the area of suspected service and network anomalies, while reducing capabilities in another area.

In some embodiments, the Service Provider configures the maximum bandwidth that can be allocated for terminal reporting in the Service Quality Report Analyser (SQRA) 16. The maximum bandwidth is the average bandwidth consumption of all terminal reporting activities in the network for all services at any time.

In some embodiments the Service Quality Report Analyser (SQRA) 16 decides if more or less bandwidth should be allocated for terminal reporting and how that bandwidth is distributed over the services and network segments based on the network status and the bandwidth utilization.

The Service Quality Report Controller (SQRO) 18 receives network status information from the network management system and the reporting configuration, giving terminal reporting bandwidth utilization, from the Service Quality Reporting Analyser (SQRA) 16.

The reporting configuration is translated into configuration management instructions, which are converted and sent directly to the terminals 26, 28, 30 or to intermediate device or terminal management systems by the Service Quality Report Controller (SQRO) 18. Such instructions are service and network segment specific, as they comply with the commands and rules defined in the appropriate standard for device management.

The Service Quality Report Controller (SQRO) 18 provides the interface towards terminals 26, 28, 30 or intermediate device or terminal management systems, depending on the required deployment. In communication networks in which a plurality of services are to be monitored by the service quality management system (SQMS) 12, the Service Quality Report Controller (SQRO) 18 is able to support a multitude of such intermediate systems at any one time.

As described above, a plurality of external data sources 24 may be provided for the service quality management system (SQMS) 12 in different embodiments. As discussed previously, external data sources 24 provide additional information that makes the terminal reports more valuable by giving them context. There are three types of data sources that can enrich the terminal reports.

A customer relationship management system 22 has information about the subscribers, subscriptions, products and services used and charged for. Information relating to one or more of revenue, subscriptions, and churn of customers from the customer relationship management system 22 can be used to enhance the terminal reporting information. In some embodiments, therefore, the service quality reporting analyser (SQRA) 16 is coupled to a customer relationship management system 22 to receive information for use in analysing the terminal service quality information and in determining a new reporting configuration.

A number of External Information systems 24 that are not specific to the Telecommunications industry can be used to enhance the terminal reports. Exemplary external information systems are: geographical Information Systems; demographic Information Systems; and meteorological Information Systems.

A first method in accordance with embodiments of the invention will now be described with reference to FIG. 6.

Embodiments of this method provide a mechanism for managing the common resources used for all the service quality reporting for a plurality of services in a network. This enables the overall resource requirements for quality monitoring of the network to be limited.

In brief, the steps of the method are:

in step 50, a global quality of service resource limit, defining the total resource available for monitoring the quality of service for all terminals for a plurality of services in the communication network, is configured;

in step 52 the service reporting resource requirements for each of the plurality of services and/or network segments are estimated;

in step 54, the available quality of service resources are allocated to the plurality of services and/or network segments;

in step 56, the terminals are instructed to send terminal service session reports for each of the plurality of services depending on the allocated quality of service resource for that service and/or network segments.

In the exemplary embodiment, the step of allocating the available quality of service resources to the plurality of services is carried out in a first step, step 58, of determining the global terminal reporting demand; and in a second step, step 60, of recalculating resource limits. Different methods of allocating the available quality of service resources to the plurality of services in step 54 may be used in different embodiments.

In the following description, reference is made to bandwidth as an example of a common resource used for service quality reporting for all services in the network. However, any resources, either physical entities or logical functions, such as memory/central processing unit (CPU) of operation and maintenance systems, or service management systems, that are shared between different services and that are used by terminal reports of different service sessions are common resources and embodiments of the invention can also be equally well applied to common resources other then bandwidth.

In more detail in an exemplary embodiment in which bandwidth is the resource to be allocated to a plurality of services, in a first step, step 50, implemented by the service quality reporting analyzer (SQRA) 16 in the exemplary embodiment, the available reporting bandwidth for multiple services is determined. The available reporting bandwidth is the bandwidth made available by the network operator for terminal reporting activities in the network for all services and network segments.

In some embodiments, the operator may configure a maximum reporting bandwidth that can be allocated for terminal reporting.

In some embodiments, the available reporting bandwidth may vary over time, for example in response to network events or service quality events. For example in some embodiments the available reporting bandwidth is adjusted (increased or decreased), manually or automatically, based on factors such as network conditions and/or service reporting requirements.

Figure 6:
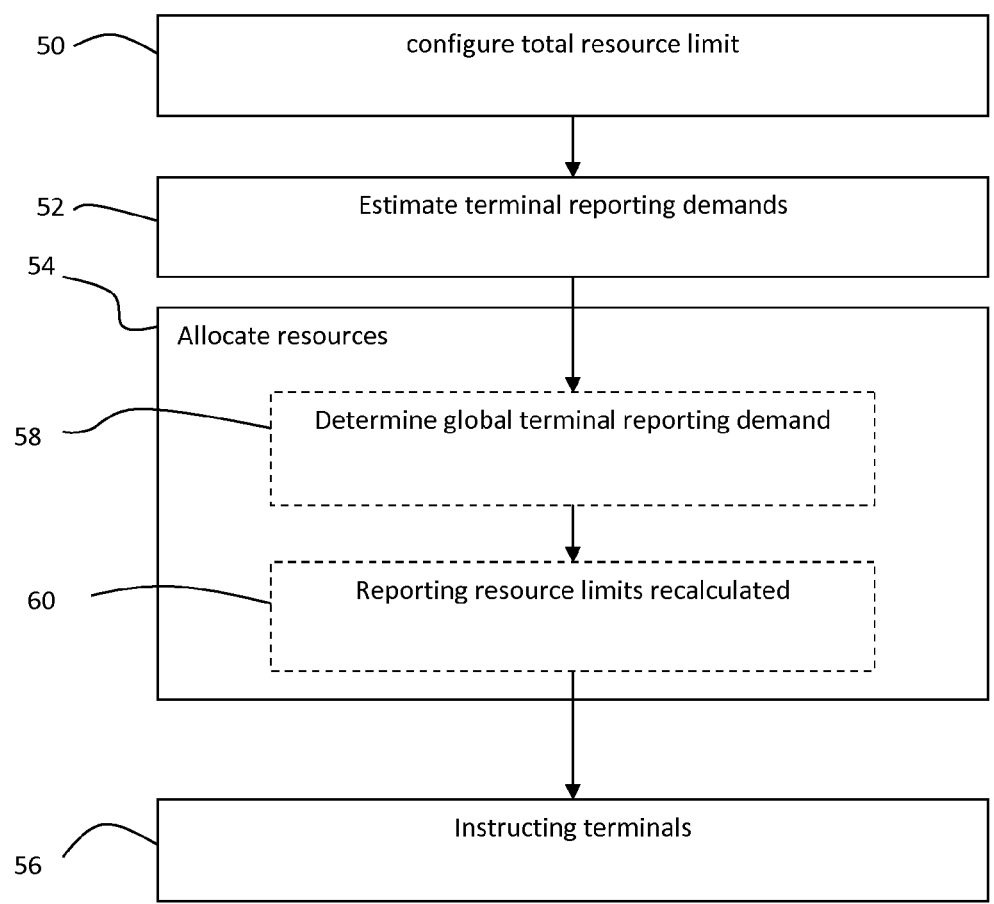
FIG. 6 is a flow chart showing steps of a method in accordance with one aspect of the invention.

In a second step of FIG. 6, step 52, which is implemented by the service quality reporting analyzer (SQRA) 16 in the exemplary embodiment, terminal reporting demands are estimated using terminal report analysis.

The service quality reporting analyzer (SQRA) 16 periodically estimates local reporting demands, for example, from each service or each network segment, by analysing collected reporting traffic.

In some embodiments, reporting demands may be measured in terms of average session arrival rates. The session arrival rate for each service or each network segment may be estimated over fixed time intervals through terminal report analysis. This may be achieved, for example, by counting the number of unique sessions in the collected reports for services implementing periodic reporting and the number of unique sessions divided by the SamplePercentage for services implementing non-periodic reporting.

In some embodiments, a standard exponentially-weighted moving average (EWMA) is applied to the average session arrival rate to smooth out short-term fluctuations.

The estimate interval and EWMA smoothing parameter may be pre-defined.

In a third step, step 58, implemented by the service quality reporting analyzer (SQRA) 16 in the exemplary embodiment, the global reporting demand from all services or network segments is found from the sum of the local reporting demands from each service or network segment. In some embodiments, local reporting demand estimates are merged to give a global reporting demand estimate at the end of an estimate interval.

In a fourth step, step 60, implemented by the service quality reporting analyzer (SQRA) 16 in the exemplary embodiment, the reporting bandwidth limits for each network segment or each service are re-calculated and the available bandwidth determined in step 50 is allocated between the service and/or network segments based on estimated reporting demands for the respective services and network segments. The allocation can be based on service types, network segments, or any other criteria.

In the exemplary embodiment a proportional allocation method of the available bandwidth is proposed. Thus, the maximum reporting bandwidth budget is allocated proportionally to each service or network segment according to their reporting demands, as below:

$$\text{local reporting bandwidth limit} = \text{maximum reporting bandwidth} \times \frac{\text{local reporting demand}}{\sum \text{reporting demand}}$$

In a fifth step 56, implemented by the service quality reporting controller (SQRO) 18 in the exemplary embodiment, terminal reporting instructions are sent in accordance with the new terminal reporting configuration in which each service or network segment uses its allocated shared bandwidth resource.

In the case of per-service bandwidth allocation, the service quality reporting controller (SQRO) 18 enforces rate limiting on reporting traffic through the configuration management functions of each service delivery protocol.

In particular, for protocols that send periodic terminal reports, the reporting intervals may be adjusted based on available bandwidth:

$$\text{reporting interval} = (\text{peak}) \text{ number of service sessions} \times \frac{\text{average report packet size}}{\text{local reporting bandwidth limit}}$$

For protocols that send non-periodic terminal reports such as those that send QoE reports after session completion, the SamplePercentage (a percentage sample of service sessions which should report reception) may be adjusted based on available bandwidth:

$$SamplePercentage = \frac{\text{reporting bandwidth limit}}{\text{(peak) session rate} \times \text{average report packet size}} \times 100\%$$

In case of per-network-segment bandwidth allocation, the bandwidth limit is directly applied to traffic policing/shaping/regulation functions of the intermediate nodes (such as routers). The intermediate nodes use their built-in bandwidth limiting functions to enforce the restriction.

As indicated above, in some embodiments, the maximum reporting bandwidth can be adjusted in response to the quality monitoring requirements of the services in the communication network.

In some embodiments the maximum reporting bandwidth can therefore be increased when service performance degradation has been detected, and then the maximum reporting bandwidth can be decreased when service performance returns to normal levels.

Figure 7:
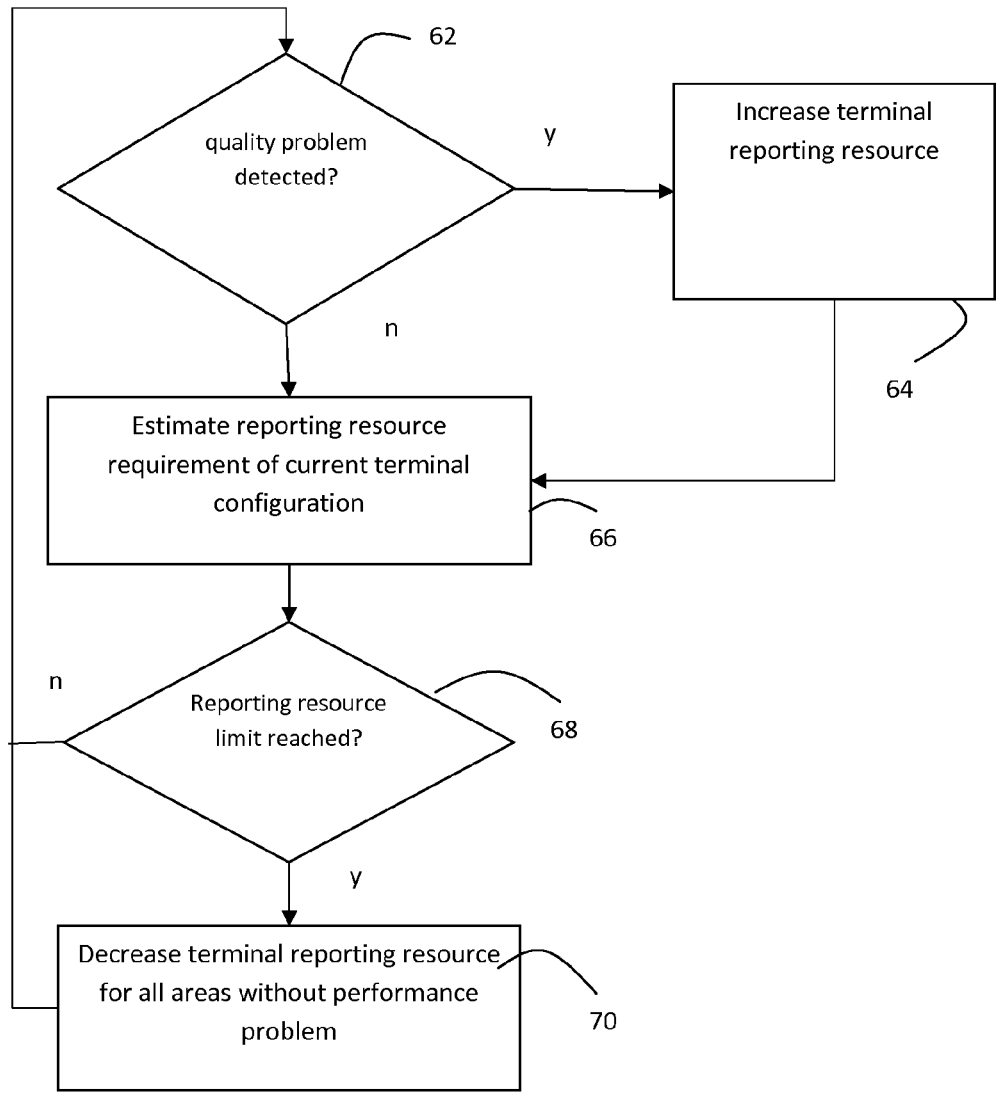
FIG. 7 is a flow chart showing steps of a method in accordance with embodiments of the invention.

An exemplary method for determining the maximum reporting bandwidth for multiple services is shown in FIG. 7.

In a first step 62 of FIG. 7, the service quality reporting analyzer (SQRA) 16 determines from the service quality information, for example network information received from the network management system 22, whether a service or network performance problem has been detected for example by detecting a degradation of service quality. The quality problem might be affecting a network segment and/or may affect one or more services within the communication network.

If so, step 62-*y*, in step 64, the service quality reporting analyzer (SQRA) 16 increments the terminal reporting bandwidth for the network segments with detected service problem or anomaly.

In both cases thereafter, in step 66 the reporting resource requirement of the reporting configuration is estimated. This might be based for example on reporting interval parameters and the number of terminals sending reports.

In step 68 it is determined whether the reporting resource limit has been reached. Typically, the reporting resource limit may be set by an operator.

If not, step 68-*n*, the service quality reporting analyzer (SQRA) 16 returns to the start of the method in step 62.

If a resource limit has been reached, step 68-*y*, the terminal reporting resource for all areas without a performance problem is decreased. Again, the quality problem might be affecting a network segment and/or may affect one or more services within the communication network.

In accordance with a second aspect of the present invention there is disclosed a method for monitoring of quality of service terminal reporting.

This method is based on selective terminal reporting for services running in a communication network, and provides two operating modes: a first monitoring mode or zoom-out reporting mode and a second analysis mode or zoom-in reporting mode.

This aspect of the invention may be implemented as a communication network with a plurality of different services, as will be described in the exemplary embodiment. However, as will be appreciated by a skilled person, in other embodiments this embodiment may be implemented within a single service or within a portion of the communication network.

Figure 8:
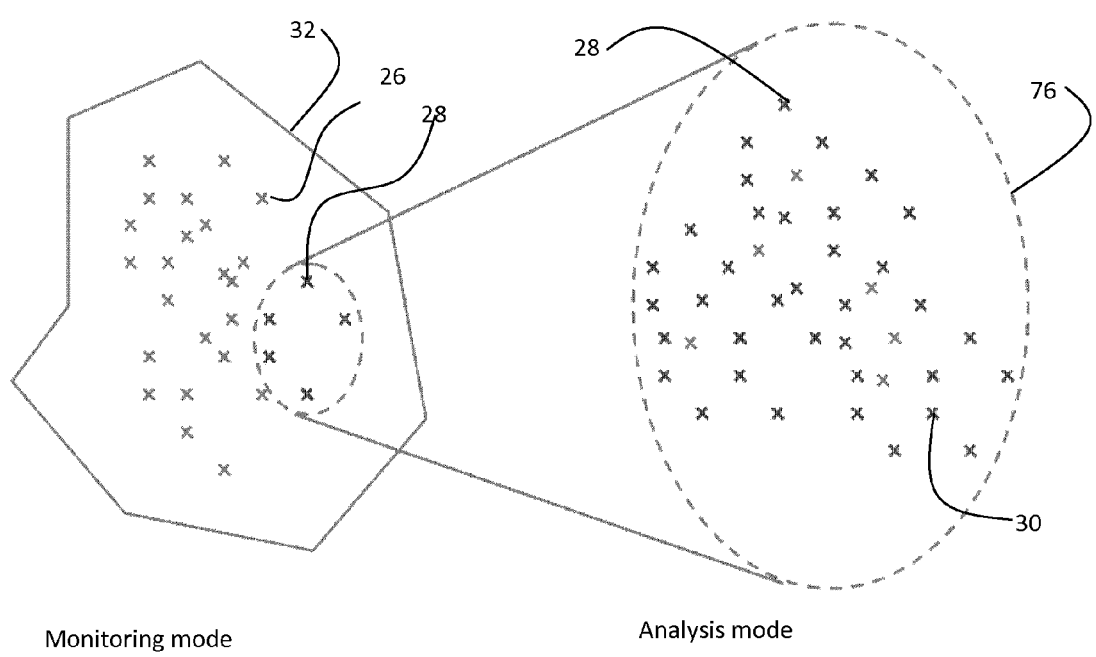
FIG. 8 is a schematic overview of the relationship between the first monitoring mode and the second analysis mode in accordance with a method according to one aspect of the invention.
Figure 9:
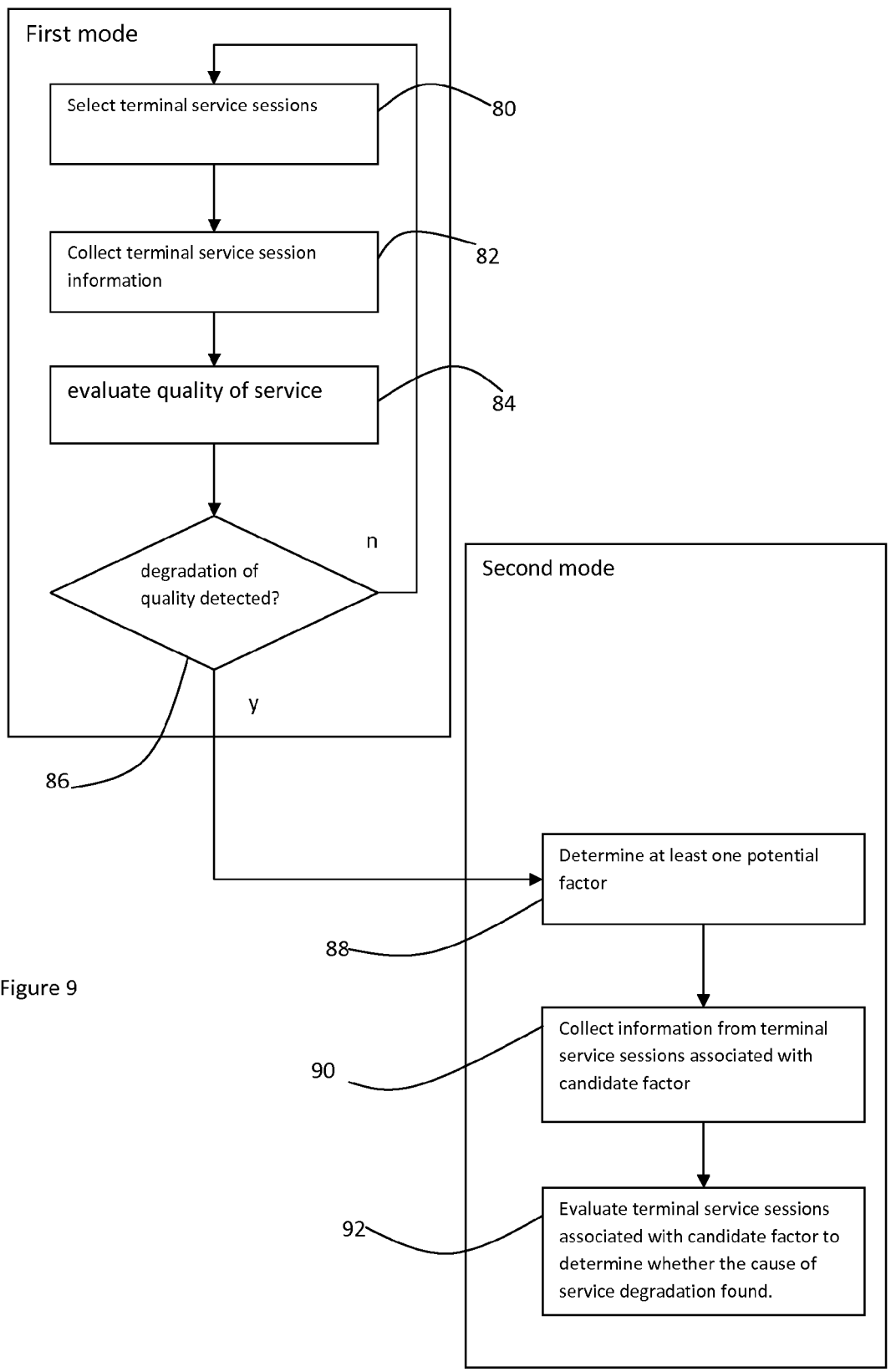
FIG. 9 is a flow chart showing steps of a method in accordance with one aspect of the present invention.

The relationship between the monitoring mode and the analysis mode is shown schematically in FIG. 8 and as a high level flow chart showing the transitions between the modes of operation in FIG. 9.

In the description of the exemplary embodiment, these operating modes are used sequentially, but in some embodiments the monitoring mode may continue during an analysis mode period. In some embodiments the monitoring mode operates continually, and the analysis mode would be used when the received quality reports suggest a quality problem in the communication network.

In the monitoring mode shown on the left hand side of FIG. 8, the quality in the communication network is monitored to determine whether any quality problem is present. In some embodiments, the service quality reporting resources used are just sufficient to monitor the quality of the services running in the network. In the exemplary embodiment a low reporting traffic overhead is maintained in this mode. Method of selecting a reporting configuration in a monitoring mode will be described later.

In the exemplary embodiment, the monitoring is carried out by evaluating the terminal service session quality information arising from the existing monitoring configuration.

If the terminal service session quality information arising from the existing monitoring configuration in the monitoring mode suggests that the service quality in a particular service or network segment is degraded, the analysis mode is entered.

In FIG. 8 a number of terminal reports are being received by the service quality management system from terminals in the terminal service configuration within the communication network 32. In FIG. 8 terminals 26, 28 are reporting quality of service information within the existing terminal configuration.

The service quality reporting analyzer (SQRA) 16 determines that service quality problems have arisen in one area 76 of the existing terminal reporting configuration, and the analysis mode is entered to analyze in more detail the service problem that has been detected. Terminal 28 is within the service problem area 76.

In this situation it must be noted that the area 76 of the existing terminal configuration may relate to a physical area or to a network segment but may in other embodiments relate to service areas or other ways of segmenting the terminal configuration.

In the analysis mode, the possible causes of a quality problem are analyzed and investigated by collecting reception reports from terminal configuration that enables a much greater degree of analysis of quality problems in the network, as will be apparent from a consideration of the following description. It should be noted that the terminal reporting configuration in the analysis node in the exemplary embodiment shown in FIG. 8 includes terminals 28 and 30.

Thus as shown in FIG. 9, in a first step 80 of the first mode terminal service sessions are selected. The selection of a suitable monitoring mode configuration will be explained in more detail below.

In a second step 82 of the first mode, terminal service session quality information is collected. As explained previously, the collection of terminal service session quality information can be achieved by the service quality report controller (SQRO) 18 instructing terminals to send quality reports and the service quality report collector (SQRC) 14 gathering and storing the resulting terminal service session quality information.

In a third step 84 of the first mode the service quality report analyser (SQRA) 16 evaluates the quality of service within the monitored network elements and in step 86 it is determined whether a degradation in the quality of service sufficient to warrant further investigation in the second analysis mode is occurring. If the network is operating with a good quality level, step 86-*n*, the first monitoring mode continues.

It may not be necessary to re-select terminal service sessions, and in this case step 80 is omitted.

The monitoring mode will now be explained in more detail. As indicated above, in the monitoring mode the reporting traffic volume may be reduced as far as possible. In this mode, typically the service quality reporting analyzer (SQRA) 16 carries out the minimal amount of monitoring across a range of services to get an indication service quality. In different embodiments the reduction in reporting traffic can be achieved in different ways.

In some embodiments reporting traffic volume may be reduced based on: candidate service selection; or service session sampling.

The use of candidate service selection to reducing reporting traffic volume is based on the observation that, in general, multiple services operate inside the same communication network and are delivered to the same terminals. In this situation, reception reports from different services may reflect similar or even the same network conditions. From the aspect of network monitoring, there exists redundant information between such reception reports. In some embodiments, service quality measurements for terminal sessions for only some of the services deployed in the network are required to adequately monitor the communication network for the provision of all services in the communication network.

The selection criteria used to select the services may include resource usage of the services; service coverage; and monitoring requirements in different embodiments.

The selection of services to provide adequate service reporting coverage in accordance with one embodiment will now be explained with reference to the following description.

It is clear that reported reception quality of a particular service reflects the status of the path between the terminal and the corresponding server or peer terminal. If a fault occurs in an intermediate node along the service delivery path, it is possible that such failure be observed from the terminal reports. So service reporting coverage is to define a set of network elements (physical entities or logical functions) whose status can possibly be reflected by terminal reports of a service.

The input to the algorithm is the network resources to be monitored, a set U with n elements, and the required coverage of reception reports of each service, a collection $S=\{S_1, S_2, \ldots, S_m\}$ of m subsets of U.

$S_i$ donates the network resource covered by service i. The elements in U can be any network resources ranging from nodes to bearers.

Without losing generality, the following description uses network nodes as an example.

The goal is to select as few subsets $S_i$ as possible from the network resource set S, such that the union of the plurality of selected sub-sets $S_i$ covers the monitoring requirement U. Thus a minimum set of services can be determined whose reports satisfy the monitoring requirement U and are a representative sample of the status of population that is the monitored network.

A selection method in accordance with an embodiment will be explained.

In a first step monitoring requirements U are defined based on input from the network operator and configuration data sources such as network topology information. The operator specifies the nodes to be monitored, such as radio access nodes or radio core nodes.

Monitoring requirement U may be generated by filtering the configurations, such as network topology.

The reporting coverage $S_i$ of each candidate service is determined by analyzing the service quality information collected from terminal reports, for example by correlating terminal reports with other data sources such as network topology information. This may be achieved in many different ways, as will be understood by a skilled person. In some embodiments an identifier of a segment of the monitored network may be added to reception reports, as set out in WO/2009/155971. In such an embodiment, correlation can be based upon such an identifier.

Coverage set $S_i$ may contain different types of network resources, which may be explicitly marked. Consumption patterns such as temporal distribution and volume of service access may also be included in the coverage set of the service.

Examples of the coverage set are as follows:

$S_{web\_browsing}=\{RAN(c_1, c_2, c_3), SGSN(sgsn_1), GGSN(ggsn_1, ggsn_2)\}$

Reception reports of web browsing service cover CELL c1, c2, c3, SGSN node sgsn1, and GGSN nodes ggsn1 and ggsn2.

$S_{web\_browsing}=\{RAN(c_1, c_2, c_3), SGSN(sgsn_1), GGSN(ggsn_1, ggsn_2), TIME(09:00-11:00), USER(1000)\}$ Reception reports of the web browsing service cover CELL c1, c2, c3, SGSN node sgsn1, and GGSN nodes ggsn1 and ggsn2 during the time period 9:00-11:00, with 1000 service access.

The minimum coverage service set, that is a minimum set of services whose reports represent the status of all of the monitored network, or the majority part of the monitored network, is determined based on the monitoring requirements U and the reporting coverage S of each candidate service.

The determination of a minimum coverage service set is one of the classical set covering problems in computer science. This problem is complex since elements in the sets are heterogeneous and multi-dimensional, but with relaxed requirements in terms of number of subsets, and therefore it is difficult to solve.

An exemplary approximation method is set out below.

```
MinCoverServiceSet(S)
{
1:   remove services from S with very low coverage
2:   FOR each time window w
3:     REPEAT
4:       select the service S_i from S as a candidate service, satisfying,
               within w, S_i covers the maximum number of
               uncovered elements of U
5:       mark those elements in U, covered by S_i, as covered
6:     UNTIL all elements in U are marked as covered
}
```

In the first step 1 those services with very low coverage, based on pre-defined thresholds in terms of covered nodes and service accesses, are removed.

In steps 2-6 the minimum cover service set for each pre-defined time window is determined.

It should be noted that in step 4, if all services in the service set S have the same level of node coverage, the service with the lowest service accesses shall be selected in order to reduce reporting overhead.

The proposed method generates the minimum cover set for each time window. The identified sets over different time periods may either be merged into one service set to send reception reports, or configured by the controller to send reception reports in each separate time window.

In other embodiments, the minimum set of services may be calculated differently, for example, using weighted dimensions and/or maximum set cover where exactly k services are selected.

Alternatively or additionally, in some embodiments reporting traffic volume in the monitoring mode may be reduced based on service session sampling. In these embodiments, for each service and network segment, the minimum sampling rate is determined for terminals and services on each terminal that must be carried out in order to get a true picture for that service.

In these embodiments, a percentage sample of service sessions reporting reception may be defined to allow only a proportional group of service sessions from the identified candidate services to send reception reports. However, other implementation options may be used to achieve the same monitoring target in other ways.

Thus, as described above, in the monitoring mode, very low terminal reporting traffic overhead is maintained until degraded service performance is detected. Clearly, in different network arrangements, the threshold for determining a sufficient service degradation to invoke the analysis mode can be selected by the operator. In some embodiments an action trigger level such as 5% of streaming sessions suffering a packet loss ratio of 2% may be set to invoke the analysis mode.

As will be apparent to a skilled person, a number of methods for detecting service performance degradation may be selected by a skilled person. In the exemplary embodiment a threshold-based method is proposed.

Once a service quality problem is determined, the "zoom in" or analysis second mode is entered, in which reporting resources are allocated so as to investigate the service quality problem and identify the cause of the degradation in the service quality that has been detected.

In the analysis mode reception reports from all terminals that satisfy certain criteria are selectively collected to analyze causes of quality problems, as will be described in more detail with reference to FIG. 9. In the exemplary embodiment, this function is implemented in the service quality reporting analyzer (SQRA) 16.

Thus as shown in FIG. 9, after a service degradation has been detected in the monitoring mode, step 86-$y$, at least one factor that might be responsible for causing the service degradation is determined in step 88 of FIG. 9.

Typically, this can be achieved by in a first step analyzing the service quality information relating to the existing monitoring mode terminal reporting configuration. In particular in the exemplary embodiment, service quality information from sessions with impaired quality is analysed to determine a set of factors which may be degrading quality.

In the exemplary embodiment, the factor analysis on sessions with degraded quality involves two steps: factor determination and factor ranking (not shown explicitly in FIG. 9).

The factor determination step characterizes sessions whose reception reports indicate degraded quality by correlating reception reports with other data sources such as terminal information (including terminal type, terminal manufacturer, and terminal software/OS version) and service configuration information. The correlation shall be based on identifications like the international mobile subscriber identity (IMSI). From this a list of possible factors is determined.

After a list of possible factors is determined, the factors may be ranked based on the significance of each factor, evaluated by the number of degraded sessions associated with the factor. It should be noted, however, that the top-ranked factor may not indicate the most likely cause due to the selective reporting and sampling mechanisms in previous stages. Thereafter, in the second zoom-in or analysis mode the quality reporting configuration, e.g. instructing all sessions satisfying the selected factor to send reception reports at normal rate.

The service quality reporting analyzer (SQRA) 16 then selects one or more than one factor for investigation.

The service quality reporting analyzer (SQRA) 16 may choose from the list of possible factors determined previously in turn, based on their significance, starting from the most significant factors. The generated reports need to be analyzed by the following step (3) before another factor is chosen.

In step 90, information is collected from terminal service sessions associated with the candidate factor. As explained previously, the collection of terminal service session quality information can be achieved by the service quality report controller (SQRO) 18 instructing terminals to send quality reports and the service quality report collector (SQRC) 14 gathering and storing the resulting terminal service session quality information.

Therefore, in the exemplary embodiment the terminal report configuration is re-configured Terminal reporting is amended to gather detailed information for each factor in order of its rank by the SQRA. That amended terminal reporting configuration is passed by the service quality reporting analyzer (SQRA) 16 to the Service Quality Report Controller (SQRO) 18 which causes it to be implemented directly or via an intermediate system.

Depending on the implementation, the service quality reporting analyzer (SQRA) 16 may set new filters and aggregations on the service quality report collector (SQRC) 14 which are used on reported data.

As will be apparent to a skilled person this function is implemented partially in service quality reporting analyzer (SQRA) 16 and partially in Service Quality Report Controller (SQRO) 18.

In step 92 the terminal service sessions are evaluated to determine whether the cause of the service degradation is found.

In the exemplary embodiments, the quality information derived from collected reports in accordance with the exemplary embodiment undergoes significance tests to determine factors contributing to service degradations.

In statistics, a result is called statistically significant if it is unlikely to have occurred by chance. If the service sessions with impaired performance are caused by the same factor(s) such as terminal software failure, the number of reception reports reflecting impaired performance shall be statistically significant among all reception reports collected based on the selected factor(s).

Suppose that in the network being studied, there are n service sessions within the observation window (for example, one week). Let $x_i$ (i=1, 2, ... n) be the variable describing whether or not there is a service failure (per service or mix-service) with session i.

$x_i$=1 if session i experiences service problem(s);
$x_i$=0 if session i doesn't experience any service problem(s);
Obviously, $x_1, \ldots, x_n$ are independent. The values of $x_1, \ldots, x_n$ can be obtained from terminal reports. The mean $\mu$ and population variance $\sigma^2$ for $x_i$ can be approximated respectively using the following equations:

$$\mu = \frac{1}{n}\sum_{i=1}^{n} x_i$$

$$\sigma^2 = \frac{1}{n-1}\sum_{i=1}^{n}(x_i - \mu)^2$$

Consider m service sessions whose service reports are collected based on the selected factor(s), among which a total of k sessions have impaired performance. Now we wish to determine whether service sessions with the selected factor has significant impaired performance problems; to test whether k is significant.

Under the null hypothesis that the m sessions are drawn independently and uniformly at random from n sessions, $$k = \sum_{i=1}^{m} x_i$$

$$E[k] = m*\mu$$

$$\text{Var}[k] = m*\sigma^2$$

If m is reasonably large (>>30), k is well approximated by a normal distribution. Therefore, k is considered significant if $$z = \frac{\frac{k}{m} - \mu}{\frac{\sigma}{\sqrt{m}}} \geq z_0,$$

where $z_0$ is the threshold.

For standard normal distribution, using values of $z_0$ as 1.64 and 1.96 provides confidence levels of 95% and 97.5%.

Figure 10:
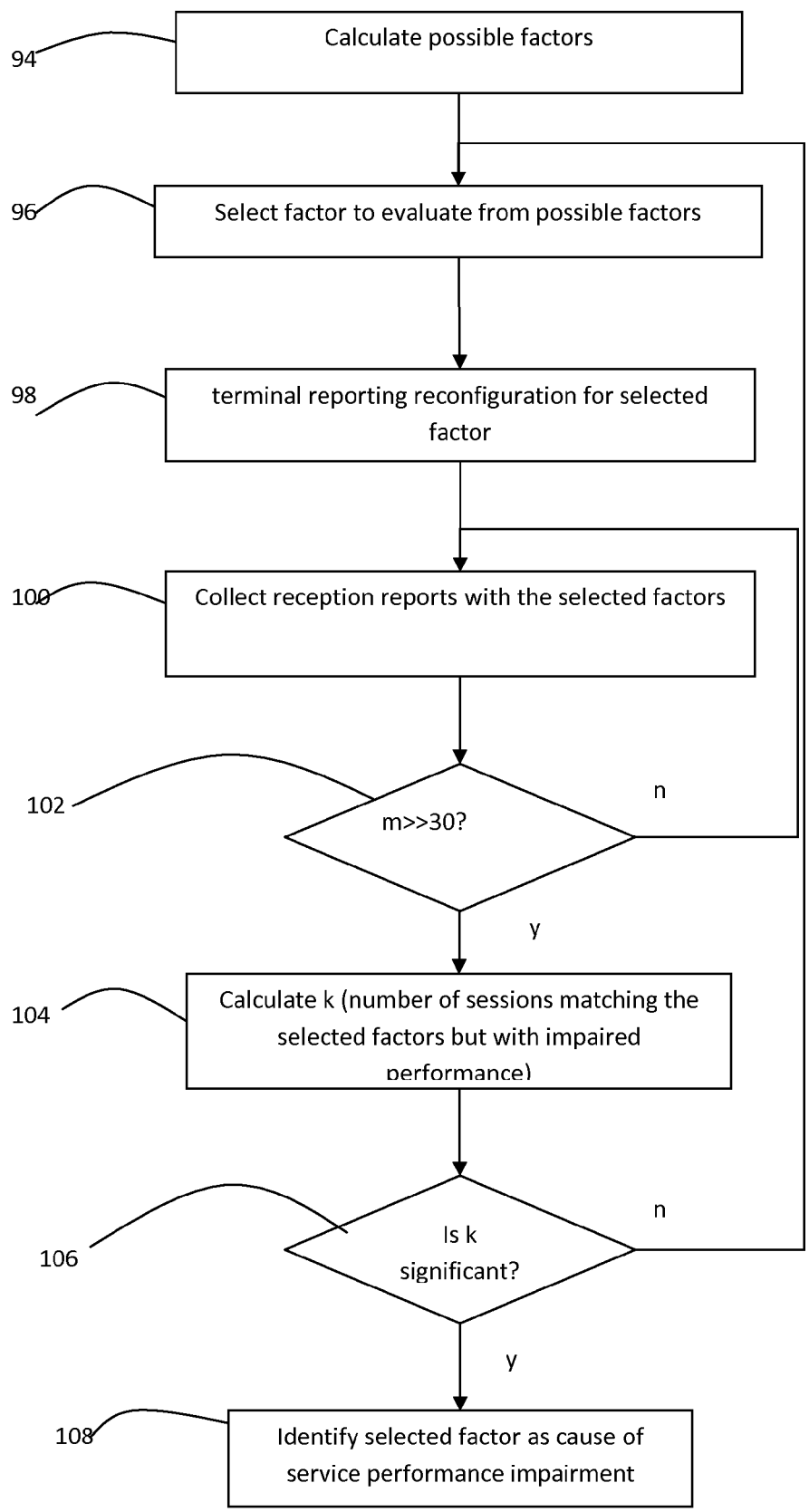
FIG. 10 is a flow chart showing steps of a method in accordance with embodiments of the invention.

Using the methods discussed above, the proposed reception report analysis and cause determination algorithm shown in FIG. 10 is provided to analyze failure significance over different sessions.

In a first step, step 94, the possible factors are identified from the service quality information gathered by the quality report collector (SQRC) 14 as discussed above.

In a second step, step 96, a factor for evaluation is selected from the possible factors as discussed above with reference to step 82 of FIG. 9.

In a third step, step 98, a new terminal reporting configuration is determined by the service quality reporting analyser (SQRA) to gather information relating to the selected factor.

In a fourth step, step 100, reception reports with the selected factors are collected by the quality report collector (SQRC) 14.

In a fifth step, step 102, it is determined whether sufficient information has been collected to determine whether the factor is relevant by determining whether quality information derived from more than 30 reception reports has been received. If not, step 102-$n$, more reception reports are collected.

If sufficient quality reports have been collected, step 102-$y$, in step 104 the number of sessions k matching the selected factors but with impaired performance is determined.

In a seventh step, step 106, it is determined whether k is significant, as described above. If k is not found to be significant, step 106-$n$ another factor for evaluation is selected in step 96

If k is significant in an eighth step, step 108, the selected factor is identified as a cause of service performance impairment.

Although an exemplary method of testing the significance of a factor is described above, other approaches using significance test methods, e.g. grouping sessions based on factors like terminal types and then analyzing failure significance of each session groups in order to identify factors that may have caused problems may be used in different embodiments.

Note that, although significance testing is used in the exemplary embodiment, in other embodiments any other methods, including but not limited to data mining techniques such as PCA, simple smoothing techniques (e.g., exponential averaging), Box-Jenkins ARIMA modeling, and wavelet-based methods, and machine learning may be used to determine the cause of the reduction in reported quality.

During the method shown in FIG. 10 the service quality report collector (SQRC) 14 collects, aggregates and filters received quality reports and may filter the quality reports to determine reporting quality information, and stores the reporting quality information.

The service quality report collector (SQRC) 14 then notifies the service quality reporting analyser (SQRA) 16 that reporting quality information is available.

The service quality reporting analyser (SQRA) 16 then analyses and carries out root cause analysis on the reports using analysis techniques suited to the particular factor being examined, as has been explained above This function is implemented partially in service quality reporting analyser (SQRA) 16 and partially in service quality report collector (SQRC) 14.

In some embodiments a client supporting the proposed terminal reporting may use the open Mobile Alliance device management (OMA-DM) solution for configuration of reporting activation and reporting behaviour, including both reporting frequency and rules. In particular, the reporting rules may be defined based on the selected factor such that only terminals matching the rules send reception reports.

Although the described embodiments use a centralized control in reporting traffic rate limiting, the invention may be implemented in other ways, including the use of a peer-to-peer limiting architecture. In a peer-to-peer controller architecture, each controller estimates local demands and sends local changes to other controllers. Each controller re-calculates local limit with received reporting demand updates, using the same calculation as described before.

As will be understood by a skilled person from a consideration of this description, embodiments of the invention provide the operator with a view of terminal reporting that enables the operator to manage the reporting bandwidth of the whole terminal population as an asset.

Embodiments of the invention provide a resource constraint (such as bandwidth limitation) to terminal reporting for all of the service sessions running inside a monitored network. With increases in service consumption and a corresponding increase in service sessions, the overall bandwidth used for terminal reporting increases linearly.

Embodiments of the invention are able to consider the topological distribution or temporal fluctuation of terminal reporting traffic. It is common in a mobile wireless network that some cells or base stations have much more load than others. The geographical locations of the cells may mean that the cell load during busy hours may get significantly higher than non-busy hours. Terminal reporting traffic generated from heavily loaded cells would be much higher than that from lightly loaded cells, the additional terminal reporting load of heavily loaded cells might be more likely to lead to congestions.

In embodiments the impaired effectiveness when adjusting reporting rate and applying resource constraints can be taken into account.

Embodiments enable areas where service problems occur to provide additional terminal reporting so that a more accurate assessment of the service problem can be made.

Embodiments of the invention provide a generic approach to managing the bandwidth required for terminal reporting.

Embodiments of the invention allow the reporting burden in the monitoring mode to be reduced, thus avoiding the need to set an arbitrary absolute value, such as 5% of session bandwidth, which may be excessive in some situations.

The invention claimed is:

1. A method of quality of service monitoring a service in a communication network, comprising:
    sending to a plurality of terminals a first set of quality report configuration parameters relevant to the service;
    collecting a first set of terminal service session reports, wherein each terminal service session report included in said first set of reports was generated by one of the plurality of terminals using the first set of quality report configuration parameters;
    detecting a degradation of service quality in the communication network based on the first set of terminal service session reports; and
    identifying a factor that is potentially causing the degradation of service quality in the communication network, wherein identifying the factor comprises:
    selecting a candidate factor;
    selecting a second set of quality report configuration parameters based on the selected candidate factor;
    sending to the plurality of terminals the second set of quality report configuration parameters;
    collecting a second set of terminal service session reports, wherein each terminal service session report included in said second set of reports was generated by one of the plurality of terminals using the second set of quality report configuration parameters; and
    evaluating whether the candidate factor is a potential cause of the service quality degradation based on the collected second set of terminal service session reports.

2. The method as claimed in claim 1,
    further comprising, prior to sending the first set of quality report configuration parameters to the plurality of terminals, selecting the plurality of terminals.

3. The method as claimed in claim 1, wherein selecting the plurality of terminals comprises:
    selecting from a plurality of services in the communication network a sub-set of services providing service reporting coverage for the total network resources to be monitored; and
    selecting a set of terminals relating to the selected sub-set of services;
    wherein the selected terminals of the selected sub-set of services are instructed to send terminal service session reports of the selected sub-set of services.

4. The method as claimed in claim 3, wherein selecting a sub-set of services from a plurality of services comprises:
    determining a network monitoring requirement corresponding to the total network resources to be monitored;
    for each service, defining the service reporting coverage corresponding to the network resources that can be monitored using terminal service quality information from terminal service sessions of the service; and
    selecting from the plurality of services in the communication network one or more services to monitor such that the sum of the service reporting coverage for the selected services covers the network monitoring requirements of the communication network.

5. The method as claimed in claim 4, wherein the services selected from the plurality of services comprise a minimum set of services sufficient to provide a cumulative service reporting coverage sufficient to cover the network monitoring requirements of the communication network.

6. The method as claimed in claim 4, wherein the service reporting coverage for a service is determined from an analysis of the terminal service quality information from previous terminal service session reports for that service.

7. The method as claimed in claim 1, wherein selecting the plurality of terminals comprises selecting a set of terminal service sessions on a reduced sample reporting basis requiring only a proportion of service sessions of a service or of a network area to send a terminal service session report.

8. The method as claimed in claim 1, wherein determining whether the candidate factor is a potential cause of the service quality degradation comprises:
    based on the second set of reports, determining a number of sessions that match the candidate factor and have experienced a degradation in service quality,
    comparing the determined number with a threshold, and
    determining whether the determined number exceeds the threshold.

9. The method as claimed in claim 8, wherein the candidate factor relates to one or more of: the service, the network location, the device; the type of terminal.

10. The method as claimed in claim 1, wherein
    the method further comprises determining a set of two or more candidate factors,
    ranking each candidate factor included in said set of candidate factors, and
    the step of selecting a candidate factor comprises selecting a candidate factor from said set of candidate factors based on the rankings.

11. The method as claimed in claim 10, wherein ranking each candidate factor comprises:
    using the first set of report to determine a number of degraded sessions associated with the candidate factor.

12. The method as claimed in claim 1, wherein evaluating whether the candidate factor is a potential cause of the degraded service quality sessions comprises: i) determining the number of service sessions that: a) are associated with the candidate factor and b) have a service degradation and ii) determining whether the determined number of such service sessions is statistically significant.

13. The method as claimed in claim 1, wherein
    collecting the second set of terminal service session reports comprises:
    receiving a first plurality of terminal service session reports:
    adding to the second set of reports each report included in the first plurality of reports;
    determining whether the number of reports includes in said second set of reports exceeds a threshold;
    as a result of determining that the number of reports includes in said second set of reports does not exceed the threshold, adding to the second set of reports additional received reports.

14. The method as claimed in claim 1, further comprising:
    configuring a global quality of service resource limit defining the total resource available for monitoring the quality of service for a plurality of services in the communication network;
    estimating service reporting resource requirements for each of the plurality of services;
    allocating the available global quality of service resource limit to the plurality of services depending upon the estimated service reporting resource requirements for the plurality of services; and
    instructing terminals to send terminal service session reports for each of the plurality of services depending on the allocated quality of service resource for that service.

15. The method as claimed in claim 14, further comprising adapting the global quality of service resource limit available depending on demand.

16. The method as claimed in claim 14, further comprising: determining whether a degradation of service quality in terminal service sessions of the service; and in response to a positive determination the step of increasing the service reporting resource requirement for the service.

17. The method as claimed in claim 14, wherein the method further comprises estimating the reporting resource requirement of the current terminal service sessions; determining whether the global quality of resource limit is reached; and decreasing terminal reporting resource allocated in areas in which a degradation of service quality has not been reported.

18. An apparatus for quality of service monitoring in a communication network, the apparatus comprising:
a transmitter;
a receiver;
data storage; and
a data processing system, comprising one or more processors, coupled to the data storage, the transmitter and the receiver, wherein the data storage stores computer instructions for programming the data processing system to:
employ the transmitter to send to a plurality of terminals a first set of quality report configuration parameters relevant to a service;
employ the receiver to collect a first set of terminal service session reports, wherein each terminal service session report included in said first set was generated by one of the plurality of terminals using the first set of quality report configuration parameters;
detect a degradation of service quality in the communication network based on the first set of terminal service session reports; and
identify a factor that is potentially causing the degradation of service quality in the communication network by:
selecting a candidate factor;
selecting a second set of quality report configuration parameters based on the selected candidate factor;
sending to the plurality of terminals the second set of quality report configuration parameters;
collecting a second set of terminal service session report, wherein each terminal service session report included in said second set was generated by one of the plurality of terminals using the second set of quality report configuration parameters; and
evaluating whether the candidate factor is a potential cause of the service quality degradation based on the collected second set of terminal service session reports.

\* \* \* \* \*